(12) United States Patent
Wang et al.

(10) Patent No.: US 11,377,303 B2
(45) Date of Patent: Jul. 5, 2022

(54) MODULAR SORTING PLATFORM AND GOODS SORTING SYSTEM

(71) Applicants: BEIJING JINGDONG SHANGKE INFORMATION TECHNOLOGY CO., LTD., Beijing (CN); BEIJING JINGDONG CENTURY TRADING CO., LTD., Beijing (CN)

(72) Inventors: Xu Wang, Beijing (CN); Meng Wang, Beijing (CN); Jinxing Hu, Beijing (CN); Fengquan Huang, Beijing (CN)

(73) Assignee: BEIJING JINGDONG QIANSHI TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/044,169

(22) PCT Filed: May 14, 2019

(86) PCT No.: PCT/CN2019/086857
§ 371 (c)(1),
(2) Date: Sep. 30, 2020

(87) PCT Pub. No.: WO2020/001184
PCT Pub. Date: Jan. 2, 2020

(65) Prior Publication Data
US 2021/0107743 A1   Apr. 15, 2021

(30) Foreign Application Priority Data
Jun. 27, 2018   (CN) .......................... 201810673195.4

(51) Int. Cl.
*B65G 37/00*   (2006.01)
*B65G 47/46*   (2006.01)

(52) U.S. Cl.
CPC .............. *B65G 37/00* (2013.01); *B65G 47/46* (2013.01)

(58) Field of Classification Search
CPC ........ B65G 11/18; B65G 11/02; B65G 37/00; B65G 47/46
See application file for complete search history.

(56) References Cited

U.S. PATENT DOCUMENTS

| | | | |
|---|---|---|---|
| 9,840,379 | B2 | 12/2017 | Yang et al. |
| 2016/0332823 | A1 | 11/2016 | Yang et al. |

(Continued)

FOREIGN PATENT DOCUMENTS

| | | | | |
|---|---|---|---|---|
| CN | 203044353 U | | 7/2013 | |
| CN | 106269540 A | * | 1/2017 | ............. B07C 3/003 |

(Continued)

OTHER PUBLICATIONS

International Search Report dated Aug. 13, 2019 in PCT/CN2019/086857 filed on May 14, 2019, 3 pages.

*Primary Examiner* — Gene O Crawford
*Assistant Examiner* — Lester Rushin, III
(74) *Attorney, Agent, or Firm* — Oblon, McClelland, Maier & Neustadt, L.L.P.

(57) ABSTRACT

The present disclosure provides a modular sorting platform and a goods sorting system. The modular sorting platform includes a support structure and combination platform. The combination platform is installed on the support structure, and is composed of a plurality of platform modules. The platform modules include: a loading module including a loading module platform worksurface for forming a worksurface of the combination platform, an input position for receiving to-be-sorted goods, and a loading module connection part for connecting with another platform module; and an unloading module including an unloading module worksurface for forming the worksurface of the combination (Continued)

platform, an output position for outputting the goods, and an unloading module connection part for connecting with another platform module. The goods sorting system includes the modular sorting platform.

11 Claims, 4 Drawing Sheets

(56) References Cited

U.S. PATENT DOCUMENTS

2017/0297828 A1* 10/2017 Solana .................. B65G 47/57
2018/0057286 A1   3/2018 Yang et al.

FOREIGN PATENT DOCUMENTS

| | | | |
|---|---|---|---|
| CN | 106269540 | A | 1/2017 |
| CN | 205906549 | U * | 1/2017 |
| CN | 206661696 | U | 11/2017 |
| CN | 206935810 | U | 1/2018 |
| CN | 207533574 | U | 6/2018 |
| CN | 208307644 | U * | 1/2019 |
| CN | 208555051 | U | 3/2019 |
| EP | 3098 187 | A1 | 11/2016 |

* cited by examiner

MODULAR SORTING PLATFORM AND GOODS SORTING SYSTEM

CROSS-REFERENCE TO RELATED APPLICATIONS

This application is based upon and claims priority to Chinese Patent Application No. 201810673195.4, filed on Jun. 27, 2018, and the invention title of "MODULAR SORTING PLATFORM AND GOODS SORTING SYSTEM", the entire contents of all of which are incorporated herein by reference.

TECHNICAL FIELD

The present disclosure relates to the technical field of sorting, and in particular, to a modular sorting platform and a goods sorting system.

BACKGROUND

In the existing goods sorting system, a cross-belt sorting technology is widely used as a mainstream and mature technology. The goods sorting system with the cross-belt sorting technology mainly includes cross-belt sorting equipment and a sorting trolley as a sorting auxiliary tool. During the sorting process, the sorting trolley carries the to-be-sorted goods and moves forward on the preset single-row track of the cross-belt sorting equipment; and a plurality of receiving parts is arranged on both sides of the track. When the trolley moves to the receiving parts corresponding to the loaded goods, the goods are delivered to the receiving parts under the control of a control system.

During finding solutions of the present disclosure, the inventors found that:

The goods sorting system with the cross-belt sorting technology is a rigid system upon the completion of the construction. Regardless of the volume of goods, the same process and equipment, and almost the same energy consumption are required to achieve sorting. At the low service volume, the goods sorting system with the cross-belt sorting technology will obviously waste energy and is difficult to upgrade or expand technology along with the service change.

It is required for several months to put the goods sorting system with the cross-belt sorting technology into use. Due to the long construction period, the goods sorting system cannot be operated and generate production benefits during the construction period. Original sorting progress will be affected due to the long-term occupation of the sorting site, if an original sorting site is transformed and upgraded.

Due to complicated layout and large occupied area, the goods sorting system with the cross-belt sorting technology needs to be customized for different sorting sites; due to the long time consumption for preliminary design, the goods sorting system is difficult to achieve mass production, resulting in the higher overall manufacturing cost of the goods sorting system. The goods sorting system is more difficult to reuse after being abandoned for reasons such as site change.

SUMMARY

The purpose of the present disclosure is to provide a modular sorting platform, and also provide a goods sorting system including the modular sorting platform.

According to a first aspect, the present disclosure provides a modular sorting platform. The modular sorting platform includes a support structure and a combination platform; and the combination platform is installed on the support structure and composed of a plurality of platform modules, where the platform modules include:

a loading module including a loading module worksurface for forming a worksurface of the combination platform, an input position for receiving to-be-sorted goods, and a loading module connection part for connecting with another platform module; and an unloading module including an unloading module worksurface for forming the worksurface of the combination platform, an output position for outputting the goods, and an unloading module connection part for connecting with another platform module.

In some embodiments, the loading module further includes:

a buffer area for buffering the goods; and/or
a scanner connection and positioning interface for connecting with a code scanner; and/or
a display connection and positioning interface for connecting with a display.

In some embodiments, the unloading module includes a receiving part connection and positioning interface arranged at the output position and connected with a goods receiving part.

In some embodiments, the loading module further includes a loading module safety facility; and/or the unloading module further includes an unloading module safety facility.

In some embodiments, the platform modules further include a charging module; and the charging module includes a charging module worksurface for forming the worksurface of the combination platform, a charging interface, and a charging module connection part for connecting with another platform module.

In some embodiments, the charging module includes a charging pile with a charging interface.

In some embodiments, the charging module further includes a charging module safety facility.

In some embodiments, the modular sorting platform includes the plurality of the combination platforms arranged and layered up and down.

In some embodiments, the support structure includes a plurality of uprights on which the combination platform is installed.

In some embodiments, the modular sorting platform further includes an anti-slip layer laid on the worksurface of the combination platform.

In some embodiments, the platform modules of the combination platform are detachably connected.

According to a second aspect, the present disclosure provides a goods sorting system. The goods sorting system includes:

the modular sorting platform according to the first aspect of the present disclosure; and a travelling trolley arranged on the combination platform and configured to carry the goods received from the input position to travel on the combination platform, and transport the goods to an output position the corresponding to the carried goods.

According to the modular sorting platform and goods sorting system of the present disclosure, combination platform is formed by using a plurality of different platform modules to obtain a modular sorting platform that meets actual needs, so as to facilitate to achieve the required sorting service.

The exemplary embodiments of the present disclosure are described in detail with reference to the accompanying drawings, so that other features and advantages of the present disclosure will become apparent.

DESCRIPTION OF DRAWINGS

The drawings described herein are used to further understand the present disclosure and constitute a part of this application; and the schematic embodiments of the present disclosure and the descriptions thereof are used to explain the present disclosure and do not constitute improper limitations to the present disclosure. In the accompanying drawings.

DESCRIPTION OF EMBODIMENTS

The following clearly and completely describes the technical solutions in the embodiments of the present disclosure with reference to the accompanying drawings in the embodiments of the present disclosure. Actually, the following description of at least one exemplary embodiment is merely illustrative, which is not intended for limiting the present disclosure, and the application or use thereof. All other embodiments obtained by persons of ordinary skill in the art based on the embodiments of the present disclosure without creative efforts shall fall within the protection scope of the present disclosure.

Unless otherwise specified, relative arrangements of components and steps, numerical expressions and values set forth in these embodiments do not limit the scope of the present disclosure. At the same time, it should be understood that for the convenience of description, the dimensions of various portions shown in the accompanying drawings are not drawn according to the actual proportional relation. Technologies, methods, and equipment known to persons of ordinary skill in the related art may not be discussed in detail, but where appropriate, they should be considered as a part of the authorized specification. In all examples shown and discussed herein, all specific values should be explained merely as being exemplary but not a limitation. Therefore, other examples of exemplary embodiments may have different values. It should be noted that similar sign numbers and letters indicate similar items in the following accompanying drawings. Therefore, once a specific item is defined in one of the accompanying drawings, a further discussion is not required for it in the subsequent drawings.

Figure 1:
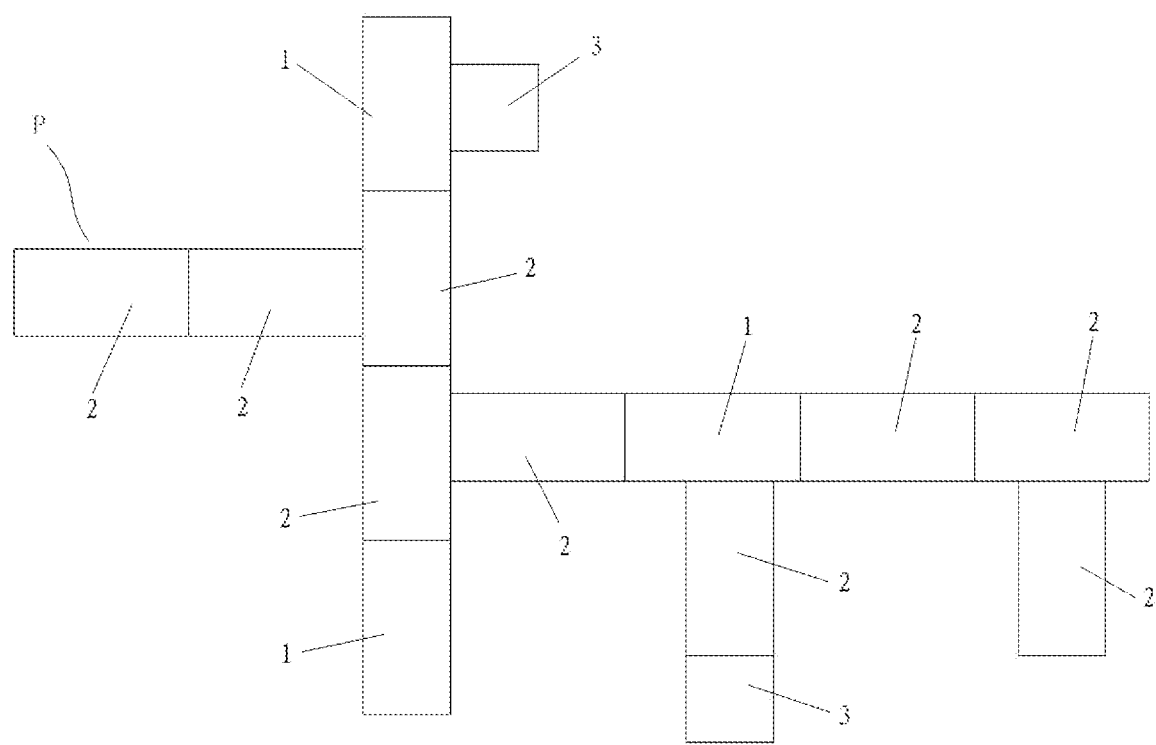
FIG. 1 is a schematic diagram of the combination principle of a modular sorting platform according to an embodiment of the present disclosure.
Figure 2:
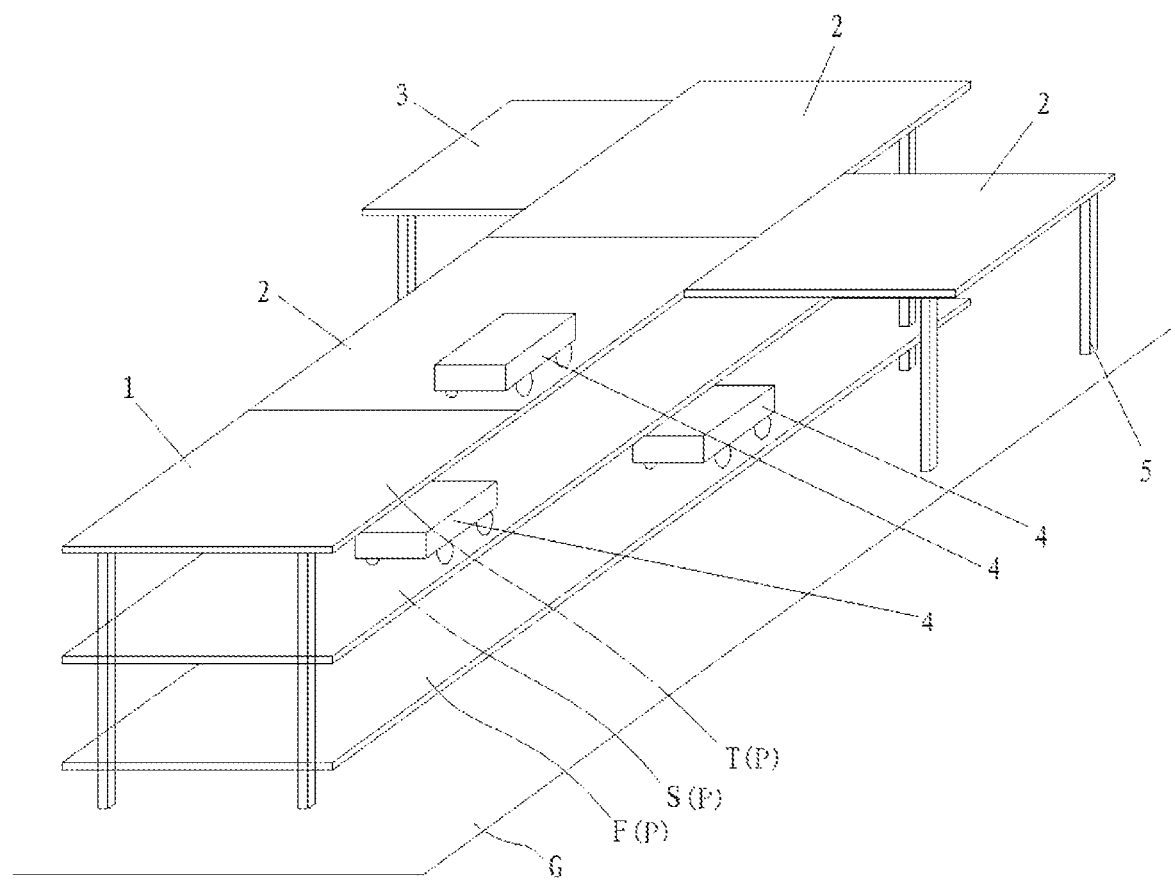
FIG. 2 is a schematic structural diagram of a goods sorting system according to an embodiment of the present disclosure.
Figure 3:
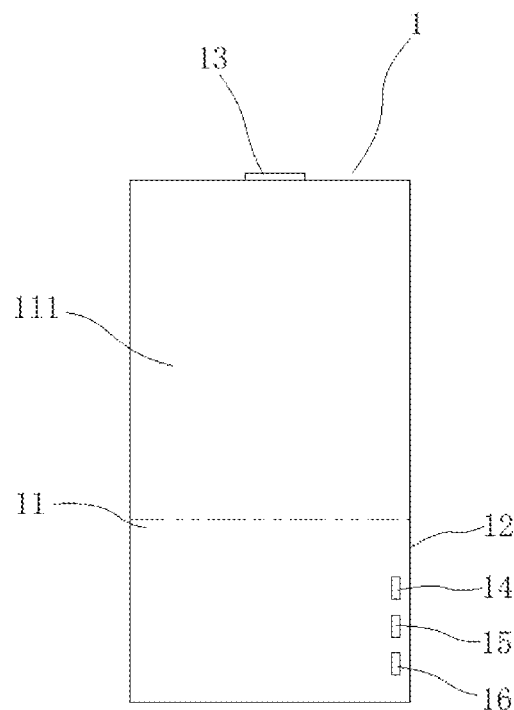
FIG. 3 is a schematic diagram of the combination principle of a loading module of a modular sorting platform according to an embodiment of the present disclosure.
Figure 4:
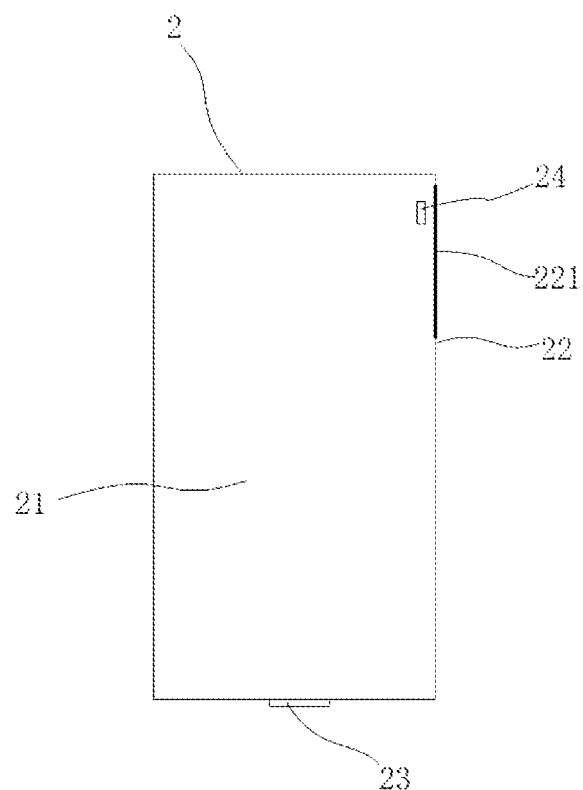
FIG. 4 is a schematic diagram of the combination principle of an unloading module of a modular sorting platform according to an embodiment of the present disclosure.
Figure 5:
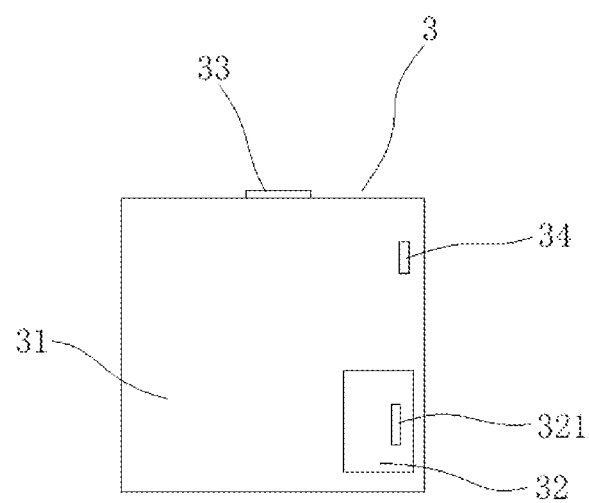
FIG. 5 is a schematic diagram of the combination principle of a charging module of a modular sorting platform according to an embodiment of the present disclosure.
Figure 6:
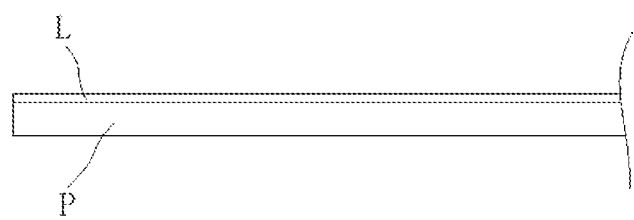
FIG. 6 is a schematic diagram of the combination principle of a combination platform and an anti-slip layer of a modular sorting platform according to an embodiment of the present disclosure.

An embodiment of the present disclosure provides a modular sorting platform and a goods sorting system. FIG. 1 is a schematic diagram of the combination principle of a modular sorting platform according to an embodiment of the present disclosure. FIG. 2 is a schematic structural diagram of a goods sorting system according to an embodiment of the present disclosure. FIG. 3 is a schematic diagram of the combination principle of a loading module of a modular sorting platform according to an embodiment of the present disclosure. FIG. 4 is a schematic diagram of the combination principle of an unloading module of a modular sorting platform according to an embodiment of the present disclosure. FIG. 5 is a schematic diagram of the combination principle of a charging module of a modular sorting platform according to an embodiment of the present disclosure. FIG. 6 is a schematic diagram of the combination principle of a combination platform and an anti-slip layer of a modular sorting platform according to an embodiment of the present disclosure.

As shown in FIG. 1 and FIG. 2, the modular sorting platform includes a support structure 5 and a combination platform P. The combination platform P is installed on the support structure 5.

In some embodiments, as shown in FIG. 1 and FIG. 2, the support structure 5 includes a plurality of uprights on which the combination platform P is installed.

As shown in FIG. 1 and FIG. 2, the combination platform P is formed by combining a plurality of platform modules detachably connected, where the platform modules include a loading module 1 and an unloading module 2.

As shown in FIG. 3, the loading module 1 includes a loading module worksurface 11 for forming a worksurface of the combination platform P, an input position 12 for receiving to-be-sorted goods, and a loading module connection part 13 for connecting with another platform module.

As shown in FIG. 4, the unloading module 2 includes an unloading module worksurface 21 for forming the worksurface of the combination platform P, an output position 22 for outputting the goods, and an unloading module connection part 23 for connecting with another platform module.

In some embodiments, as shown in FIG. 4, the unloading module 2 includes a receiving part connection and positioning interface 221 arranged at the output position 22 and connected with a goods receiving part. For example, the receiving part is a sorting grid.

In some embodiments, as shown in FIG. 3, the loading module 1 includes a buffer area 111 for buffering the goods. The buffer area is configured to buffer 111 the loaded goods when many goods enter an input port and are not timely sorted, instead of waiting for the loading of the goods at the input port.

In some embodiments, as shown in FIG. 3, the loading module 1 further includes a scanner connection and positioning interface 14 for connecting with a code scanner. The goods are provided with goods information which is identified by the code scanner.

The goods sorting system with the modular sorting platform of the embodiment includes the code scanner connected with the scanner connection and positioning interface 14 and a control system connected with the code scanner, a travelling trolley 4 coupled with the control system and arranged on the combination platform P, and a goods receiving part arranged corresponding to the output position 22 and for receiving goods. After the goods information from the code scanner are received by the control system, the travelling trolley 4 is controlled according to the goods information to travel on the combination platform P to an output position 22 corresponding to the goods information, and the goods are unloaded to the receiving part. For example, the goods may be a to-be-sorted package on which labels with package information are attached. The code scanner obtains the package information by scanning the labels. For example, the package information includes address information indicating a package delivery address, and the control system controls the travelling trolley 4 to transport the goods to the corresponding output position 22 and receiving part corresponding to the address information according to the address information.

In some embodiments, as shown in FIG. 3, the loading module 1 further includes a display connection and positioning interface 15 for connecting with a display. The goods information is displayed by the display, for example, package information.

In some embodiments, as shown in FIG. 1 and FIG. 5, the plurality of platform modules further include a charging module 3. The charging module 3 includes a charging module worksurface 31 for forming the worksurface of the combination platform P, a charging interface 321, and a charging module connection part 33 for connecting with another platform module.

In some embodiments, as shown in FIG. 5, the charging module 3 includes a charging pile 32 with a charging interface 321. The charging module 3 also includes a matching line connected with the charging pile 32.

The worksurface of the combination platform P only needs to be configured to carry the travelling trolley 4 and the goods carried on the travelling trolley 4 instead of carrying workers or other equipment, and thus the worksurface can be lightweight; the loading module worksurface 11, the unloading platform worksurface and the charging platform worksurface can be made of metal or other materials such as wood or plastic.

In some embodiments, as shown in FIG. 3, the loading module 1 further includes a loading module safety facility 16.

In some embodiments, as shown in FIG. 4, the unloading module 2 further includes an unloading module safety facility 24.

In some embodiments, as shown in FIG. 5, the charging module 3 further includes a charging module safety facility 34.

For example, the loading module safety facility 16, the unloading module safety facility 24 or the charging module safety facility 34y includes testing facilities, alarm facilities, equipment safety protection facilities, and the like. For example, the testing facilities include inspection and testing equipment and instruments for safety inspection, and safety data analysis; the alarm facilities include toxic, hazardous, and prohibited substances alarm facilities; and the equipment safety protection facilities include electrostatic grounding facilities, electrical overload protection facilities, and protective screens.

In some embodiments, the platform modules of the combination platform P are detachably connected. The connected platform modules are detachably connected, facilitating the rapid installation of the modular sorting platform during on-site construction, and facilitating the removal and reuse of the modular sorting platform. The connection parts of all platform modules, such as the loading platform connection part, the unloading platform connection part and the charging platform connection part, are selected from the uniform or matched structures, to flexibly arrange the platform modules of the combination platform P as required.

The connection parts between the connected platform modules are connected by connection structures quickly disassembled and assembled, for example, a threaded connection structure, a clamping structure, and a pin connection structure.

In some embodiments, as shown in FIG. 2, the modular sorting platform includes a plurality of combination platforms P layered up and down. The number of combination platforms P is set according to factors such as site and sorting quantity, including two layers, three layers or more than three layers.

In the embodiment shown in FIG. 2, the goods sorting system and the modular sorting platform thereof are provided with three layers of combination platforms P, including a first layer of combination platform F, a second layer of combination platform S, and a third layer of combination platform T. In FIG. 2, only the combination way of the platform modules of the third-layer combination platform T is exemplarily shown, instead of showing those of the platform modules of the first-layer combination platform F and third-layer combination platform T or all platform modules of the first-layer combination platform F and third-layer combination platform T.

As shown in FIG. 2, three layers of combination platforms are installed on the support structure 5 including a plurality of uprights arranged on a support surface G. For example, the support surface G is ground or floor. It should be noted that, in FIG. 2, the number and positions of uprights are only schematically showed to illustrate the support structure 5. When the modular sorting platform and the goods sorting system are specifically arranged, the number and positions of uprights required for the support structure 5 is correspondingly determined according to the number, types and positions of platform modules.

The support structure 5 can be diverse, for example, which is a frame structure including a plurality of uprights and a plurality of beams.

In some embodiments, as shown in FIG. 6, the modular sorting platform further includes an anti-slip layer L laid on the worksurface of the combination platform P. The anti-slip layer is, for example, a rubber pad laid on the worksurface of the combination platform P.

As shown in FIG. 2, the goods sorting system of the embodiment of the present disclosure includes the modular sorting platform P and the travelling trolley 4. The travelling trolley 4 is arranged on the combination platform P and configured to carry the goods received from the input position 12 to travel on the combination platform P, and transport the goods to the output position 22 corresponding to the carried goods.

When the modular sorting platform and the goods sorting system are specifically arranged, the number and positions of the platform modules in the combination platform P, as well as the shape of combination platform P are selected according to factors such as the site shape, the building structure, the sorting amount, the amount of receiving parts required for arrangement, and the like. Multi-layer combination platforms P are layered up and down and each layer of combination platforms P operates independently and safely, so as to improve the space utilization rate and enhance the sorting capability in a given area. According to the above description, the modular sorting platform and the goods sorting system in the embodiment of the present disclosure have at least one of the following technical effects:

1. Combination platform is formed by using a plurality of different platform modules to obtain the modular sorting platform that meets actual needs, so as to help to achieve the required sorting service.

2. The number of platform modules is selectively increased or decreased according to the service volume within a period of time or expected time, which is convenient for adjusting the sorting volume of the goods sorting system, and helps to avoid the waste of resources due to the large volume of the goods sorting system under the small volume of goods sorting or avoid the delay of goods sorting due to the small volume of the goods sorting system under the large volume of goods sorting.

3. The design and production periods of all platform modules are relatively quick; and a plurality of platform modules is quickly assembled according to application requirements to form the modular sorting platform and the goods sorting system, which is beneficial to the rapid production and use of the goods sorting system and suitable for various production environment, and improves flexibility.

4. The modular sorting platform and the goods sorting system are easy to disassemble and transport, and all platform modules are reusable, thereby helping to put the platform module disassembled from a specific modular sorting platform into other similar modular sorting platforms for reuse and effectively saving the cost.

Finally, it should be noted that the foregoing embodiments are merely intended for describing the technical solutions of the present disclosure, but not for limiting the present disclosure. Although the present disclosure is described in detail with reference to the preferred embodiments, persons of ordinary skill in the art should understand that they may still make modifications to the specific implementations of the present disclosure or make equivalent replacements to some technical features thereof. The modifications or the equivalent replacements should be covered within the scope of the claimed technical solutions of the present disclosure.

The invention claimed is:

1. A modular sorting platform, comprising:
    a support structure; and
    a combination platform installed on the support structure and composed of a plurality of platform modules, wherein the platform modules comprise:
    a loading module comprising a loading module worksurface for forming a worksurface of the combination platform, an input position for receiving to-be-sorted goods, and a loading module connection part for connecting with another platform module;
    an unloading module comprising an unloading module worksurface for forming the worksurface of the combination platform, an output position for outputting the goods, and an unloading module connection part for connecting with another platform module; and
    a charging module, comprising a charging module worksurface for forming the worksurface of the combination platform, a charging interface, and a charging module connection part for connecting with another platform module.

2. The modular sorting platform according to claim 1, wherein the loading module comprises:
    a buffer area for buffering the goods; and/or
    a scanner connection and positioning interface for connecting with a code scanner; and/or
    a display connection and positioning interface for connecting with a display.

3. The modular sorting platform according to claim 1, wherein the unloading module comprises a receiving part connection and positioning interface arranged at the output position and connected with a goods receiving part.

4. The modular sorting platform according to claim 1, wherein
    the loading module further comprises a loading module safety facility; and/or
    the unloading module further comprises an unloading module safety facility.

5. The modular sorting platform according to claim 1, wherein the charging module comprises a charging pile with the charging interface.

6. The modular sorting platform according to claim 1, wherein the charging module further comprises a charging module safety facility.

7. The modular sorting platform according to claim 1, comprising a plurality of combination platforms arranged and layered up and down.

8. The modular sorting platform according to claim 1, wherein the support structure comprises a plurality of uprights on which the combination platform is installed.

9. The modular sorting platform according to claim 1, further comprising an anti-slip layer laid on the worksurface of the combination platform.

10. The modular sorting platform according to claim 1, wherein the platform modules of the combination platform are detachably connected.

11. A goods sorting system, comprising:
    the modular sorting platform according to claim 1; and
    a travelling trolley arranged on the combination platform and configured to carry the goods received from the input position to travel on the combination platform and transport the goods to an output position corresponding to the carried goods.

* * * * *